# (12) United States Patent
Veeramasuneni et al.

(10) Patent No.: US 7,892,472 B2
(45) Date of Patent: Feb. 22, 2011

(54) METHOD OF MAKING WATER-RESISTANT GYPSUM-BASED ARTICLE

(75) Inventors: Srinivas Veeramasuneni, Grayslake, IL (US); Kathryn Capacasa, Hainsville, IL (US)

(73) Assignee: United States Gypsum Company, Chicago, IL (US)

( * ) Notice: Subject to any disclaimer, the term of this patent is extended or adjusted under 35 U.S.C. 154(b) by 973 days.

(21) Appl. No.: 10/917,177

(22) Filed: Aug. 12, 2004

(65) Prior Publication Data

US 2006/0035112 A1  Feb. 16, 2006

(51) Int. Cl.
*B28B 11/24* (2006.01)
(52) U.S. Cl. ........................................ 264/333
(58) Field of Classification Search ................ 264/333; 106/783
See application file for complete search history.

(56) References Cited

U.S. PATENT DOCUMENTS

| | | | | |
|---|---|---|---|---|
| 2,127,952 | A | * | 8/1938 | Choate ........................ 106/775 |
| 2,198,776 | A | | 4/1940 | King et al. |
| 3,455,710 | A | | 7/1969 | Nitzsche et al. |
| 3,935,021 | A | | 1/1976 | Greve et al. |
| 4,411,701 | A | | 10/1983 | Saito et al. |
| 4,411,702 | A | | 10/1983 | Makino et al. |
| 4,486,476 | A | | 12/1984 | Fritsch et al. |
| 4,618,642 | A | * | 10/1986 | Schoenherr ................. 524/425 |
| 4,643,771 | A | | 2/1987 | Steinbach et al. |
| 4,647,496 | A | | 3/1987 | Lehnert et al. |
| 4,975,122 | A | | 12/1990 | Parkinson et al. |
| 5,135,805 | A | | 8/1992 | Sellers et al. |
| 5,220,762 | A | | 6/1993 | Lehnert et al. |
| 5,366,810 | A | | 11/1994 | Merrifield et al. |
| 5,626,668 | A | | 5/1997 | Gerhardinger et al. |
| 6,106,607 | A | | 8/2000 | Be et al. |
| 6,569,541 | B1 | | 5/2003 | Martin et al. |
| 2003/0203191 | A1 | | 10/2003 | Randall |

FOREIGN PATENT DOCUMENTS

| | | |
|---|---|---|
| CA | 2116443 | 3/1993 |
| JP | 07-330410 | 12/1995 |
| JP | 07-330411 | 12/1995 |
| JP | 09-142915 D1 | 3/1997 |

OTHER PUBLICATIONS

English Translation of JP 09-142915; Translated for the USPTO by Schreiber Translations, Inc. Aug. 2010, cover and pp. 1-24.*

* cited by examiner

*Primary Examiner*—Christina Johnson
*Assistant Examiner*—Patrick Butler
(74) *Attorney, Agent, or Firm*—Greer, Burns & Crain, Ltd.; David F. Janci, Esq.; Philip T. Petti, Esq.

(57) ABSTRACT

A moisture resistant gypsum-based product, e.g., a gypsum board, is made by adding a small amount of a siloxane to the aqueous slurry used to make the gypsum-based product along with a small amount of a dead burned magnesium oxide catalyst to enhance the curing of the siloxane. In the preferred embodiment, the siloxane is formed into an aqueous emulsion in situ with no chemical emulsifier.

14 Claims, No Drawings

METHOD OF MAKING WATER-RESISTANT GYPSUM-BASED ARTICLE

FIELD OF THE INVENTION

The present invention relates to a method of making moisture resistant gypsum-based products, e.g., gypsum boards, reinforced gypsum composite boards, plasters, machinable materials, joint treatment materials, and acoustical tiles, by adding a small amount of a siloxane to the aqueous slurry used to make the gypsum-based product. More particularly, the present invention relates to the addition of a small amount of a dead burned magnesium oxide catalyst to the aqueous slurry to enhance the curing of the siloxane.

BACKGROUND

Gypsum is a naturally occurring mineral which is typically found in old salt-lake beds, volcanic deposits and clay beds. In chemical terms, gypsum is calcium sulfate dihydrate ($CaSO_4 2H_2O$). This material is produced also as a by-product in various industrial processes.

When calcium sulfate dihydrate is heated sufficiently, a process called calcining, the water of hydration is driven off and there can be formed either calcium sulfate hemihydrate ($CaSO_4$ ½ $H_2O$) or calcium sulfate anhydrite ($CaSO_4$) depending on the temperature and duration of exposure. The term "calcined gypsum." as used herein, refers to both the hemihydrate and anhydrite forms of calcium sulfate.

Calcined gypsum is capable of reacting with water to form calcium sulfate dihydrate which is a fairly hard and rigid product and which is referred to herein as "set gypsum."

An example of a common gypsum product is gypsum board, which is widely used as a structural building panel. Speaking generally, gypsum board comprises a core made from an aqueous slurry of calcined gypsum which hydrates to form set gypsum. Typically, the board has a paper sheet lining adhered to both of its faces.

A characteristic of set gypsum is that it has a tendency to absorb water. To illustrate, a gypsum core containing no water-resistant additives can absorb as much as 40 to 50 wt. % water when immersed therein at a temperature, of 70° F. for about two hours. In applications where the gypsum product is exposed to water or high humidity, this characteristic is undesirable. The absorption of water by the gypsum tends to reduce the strength of the product to render the product vulnerable to microbiological growth, and to cause the facings to delaminate.

Gypsum board may be used also in bathrooms as an underlying surface which is covered with plastic or ceramic tile and for this purpose it is often referred to as a "tile-backing board." In applications such as these, it is important that the gypsum board exhibit good water resistance.

These prior art products, like ordinary gypsum wallboard, gypsum tile, gypsum block, gypsum casts, and the like have relatively little resistance to water. When ordinary gypsum wallboard, for example, is immersed in water. the board quickly absorbs a considerable amount of water, and loses a great deal of its strength. Actual tests have demonstrated that when gypsum board core material was immersed in water for 2 hours at about 70° F., per ASTM Test 1396, water absorption in excess of 40% are common. Many attempts have been made in the past to improve the water resistance of gypsum products. These attempts have included the incorporation of water-resistant materials such as metallic soaps, asphalts, siloxanes, resins, etc., within the calcium sulfate hemihydrate slurry. They have also included attempts to coat the finished gypsum product with water resistant films or coatings. One specific example of past attempts to waterproof gypsum integrally by the addition of water-repellent substances is disclosed in U.S. Pat. No. 2,198,776 to King and Camp. This shows the incorporation of paraffin, siloxane, asphalt, etc. into the aqueous slurry by spraying the molten material into the slurry.

The present invention relates to an improved method of manufacturing water-resistant gypsum compositions which have incorporated therein a siloxane to impart water resistance to the set gypsum product.

The expression "water resistant" should be understood to mean the ability of a prefabricated structural element as defined above to limit the uptake of water by the plaster substrate, while still retaining the dimensional stability and mechanical integrity of the structural element in question.

Depending on the countries, this water resistance is codified or regulated by specific standards. The ASTM 630/630M-96a and the ASTM 1398 standards require in particular that, when such a gypsum-base article is immersed in water for two hours, the water uptake by the plaster substrate is less than 5% and the water absorption on the surface (called the Cobb equivalent) is less than 1.60 $g/m^2$.

This water repellency is achieved by using any process comprising, in general, at least the following steps:

(a) homogeneously mixing a dry material, comprising mostly at least one hydratable calcium sulfate, the abovementioned water-repellent agent, and water and preforming said substrate in the wet state;

(b) drying the preformed substrate in order to obtain said substrate formed in the solid and dry state.

With such a process, it is difficult to control the amount of water-repellent agent incorporated into the plaster substrate, for example in the form of a silicone oil, and therefore the potential of the water-repellent agent is not exploited.

The use of siloxanes to make moisture resistant gypsum-based products, such as gypsum wall board, is well known. Generally, a small amount of a siloxane is added to the aqueous slurry used to make the gypsum-based product and the product is formed and dried. The production of such moisture resistant gypsum-based products is described in U.S. Pat. Nos. 3,455,710; 4,643,771; 5,135,805; 5,220,762; 5,366,810; 5,626,668; 6,100,607 and 6,569,541 among others. It has been found, however, that in some cases the siloxane used to make the gypsum-based product water resistant does not completely cure in a reasonable period of time or does not completely cure at all. In either case, the water resistance does not develop to a satisfactory level.

It is the object of the present invention to provide a method of incorporating siloxane to the slurry along with a catalyst to enhance the curing of the siloxane to accelerate and improve the development of water-resistance in gypsum-based articles.

SUMMARY OF THE INVENTION

The present invention relates to a method of making moisture resistant gypsum-based products, e.g., gypsum boards, reinforced gypsum composite boards, plasters, machinable materials, joint treatment materials, and acoustical tiles, by adding to the aqueous slurry used to make the gypsum-based product a small amount of a siloxane and a catalyst to enhance the curing of the siloxane. The method comprises mixing a siloxane emulsion with the gauging water used to prepare said gypsum-based article; mixing a dead burned magnesium oxide catalyst with calcined gypsum; mixing the silicone/water mixture with the gypsum/magnesium oxide mixture to form an aqueous slurry; and shaping the slurry into the desired shape and allowing said shaped slurry to set to form a set gypsum-based, water-resistant article.

The present invention contemplates the use of about 0.4 to 1.0% of the siloxane, based on the weight of the calcined gypsum and other dry ingredients. In the preferred process a siloxane/water emulsion is formed in situ by mixing the siloxane with a portion of the gauging water in a high intensity mixer for a few seconds.

In the preferred embodiment, the catalyst is dead-burned magnesium oxide. Preferably, about 0.1 to about 0.5 wt % of magnesium oxide is used, based on the weight of the gypsum.

DESCRIPTION OF THE PREFERRED EMBODIMENTS

In a conventional process for manufacturing gypsum-based structures, such as wallboard, a metered amount of water (called "gauging water") and any other liquid components are continuously fed into a "pin mixer." The calcined gypsum and the other dry ingredients used to make the wallboard are usually dry blended and then are continuously fed to the pin mixer where they are mixed with the gauging water for a few seconds to form an aqueous slurry. Foam used to reduce the wallboard density may also be added to the pin mixer. The slurry formed in the pin mixer is then shaped into the article, such as the wall board and then the shaped article is dried.

In order to obtain the best water resistance, it is necessary to uniformly distribute the siloxane on the gypsum. Because a relatively small amount of siloxane is used, it has been found that the most uniform distribution of the siloxane on the gypsum is provided when the siloxane, in the form of an emulsion, is mixed with the gauging water. This uniformly distributes the siloxane throughout the gauging water used to form the gypsum slurry. The gauging water, premixed with the siloxane, is mixed with the gypsum and other dry materials in the pin mixer to form the slurry.

The Siloxane

The present invention broadly contemplates improving the water resistance of gypsum based articles by adding a polymerizable siloxane, in the form of a stable emulsion, to the slurry used to make the gypsum based articles. The slurry is then shaped and dried under conditions which promote the polymerization of the siloxane to form a highly cross-linked silicone resin. Preferably a catalyst which promotes the polymerization of the siloxane to form a highly cross-linked silicone resin is added to the gypsum slurry.

The siloxane is generally a fluid linear hydrogen-modified siloxane, but can also be a cyclic hydrogen-modified siloxane. Such siloxanes are capable of forming highly cross-linked silicone resins. Such fluids are well known to those of ordinary skill in the art and are commercially available and are described in the patent literature. Typically, the linear hydrogen modified siloxanes useful in the practice of the present invention comprise those of the general formula:

$RHSiO_{2/2}$ wherein R represents a saturated or unsaturated mono-valent hydrocarbon radical. In the preferred embodiments, R represents an alkyl group and most preferably R is methyl.

The siloxane emulsion is preferably added to the gauging water before the slurry is formed order to provide sufficient time for the siloxane emulsion to thoroughly mix with water used to form the slurry.

It is essential that the siloxane emulsion be stable until it reaches the pin mixer and that it remain well dispersed under the conditions of the slurry. That is, the siloxane emulsion must remain well dispersed in the presence of the additives, such as accelerators, that are present in the slurry. The siloxane emulsion must remain stable through the steps in which the gypsum based articles are formed as well.

The gypsum-based water resistant articles of the present invention are preferably made with a methyl hydrogen polysiloxane fluid sold under the name SILRES BS-94 by Wacker-Chemie GmbH as the siloxane. The manufacturer indicates this product is a siloxane fluid containing no water or solvents. It is contemplated that about 0.3 to 1.0% of the BS-94 siloxane may be used, based on the weight of the dry ingredients. It is preferred to use from about 0.4 to about 0.8% of the siloxane.

The Siloxane Emulsions

The present invention contemplates the use of a wide variety of siloxane emulsions to provide improved water resistance. In the preferred process a siloxane/water emulsion is formed in situ by mixing a siloxane fluid with a small amount of water in a high intensity mixer for a few seconds. No chemical emulsifier is used. It has been found that this process produces an emulsion that is sufficiently stable that it can be mixed with the gauging water to distribute the siloxane uniformly throughout the gauging water. The siloxane/water emulsion enters the pin mixer and is mixed with the calcined gypsum and other dry materials to form the slurry.

In accordance the preferred embodiment of the present invention, a portion of the gauging water is continuously stripped from the gauging water line and fed into a high intensity mixer. The required amount of a siloxane oil is continuously metered into the high intensity mixer where it is mixed with the gauging water for 1-2 seconds to form an oil-in-water emulsion in situ. A ratio of about 25 parts of water may be mixed with each part of siloxane. The ratio of water to siloxane is not critical. It is preferred to use no chemical emulsifying agent because emulsifiers can adversely effect the gypsum rehydration reaction, the stability of foam added to the system and the adhesion of the paper facing to the gypsum core. It has been found that the siloxane/water emulsion formed in situ is sufficiently stable without any chemical emulsifier.

Pre-made siloxane emulsions also may be used. However, pre-made siloxane emulsions frequently have stability problems during storage and the emulsifiers used with pre-made emulsions tend to cause problems in making the gypsum article, such as paper adhesion problems and problems in the gypsum rehydration process In the preferred embodiment, the siloxane/water emulsion formed in the high-intensity mixer is immediately mixed with the balance of the gauging water, which is then metered into the pin mixer. The siloxane/water emulsion is sufficiently stable that retains its characteristics as an emulsion as it enters the pin mixer. This procedure results in the siloxane being uniformly distributed throughout the aqueous gypsum slurry and uniformly distributed throughout the resulting gypsum-based article.

The Catalyst

The siloxane product described above is a hydrogen polysiloxane. It cures by forming a reactive silanol intermediate (OH compound) to yield polymethylsilicic acid. It is postulated that in order to develop the water resistance, it is necessary for the siloxane to cure within the wallboard. When the siloxane is added to the gypsum slurry, the curing reaction begins quite slowly. In many cases, the water-resistance of the wallboard made by the foregoing process does not develop for a week or two. In other cases, the water-resistance of the wallboard made by the foregoing process does not develop completely. When the siloxane cures slowly and the water-resistance does not develop immediately, the wallboard must be stored for a time sufficient for the water-resistance to develop before the board can be shipped.

It has been discovered that certain catalysts can be added to the gypsum slurry to improve the cure of the siloxane that provides the wallboard with water absorption resistance. It is important that the catalyst be relatively water insoluble and non-reactive with the components of the gypsum slurry. For example, the alkaline earth oxides and hydroxides, suggested by the prior art, are relatively water soluble and as a result the alkaline earth oxides and hydroxides raise the pH of the slurry. The higher pH interferes with the rehydration of calcined gypsum hydration. Moreover, the alkaline earth oxides and hydroxides rapidly react with the siloxane to cause rapid evolution of hydrogen.

The preferred catalyst is dead-burned magnesium oxide because it almost completely water insoluble and is non-reactive with the components of the slurry other than the siloxane. The dead burned magnesium oxide speeds up the curing of the siloxane and, in some cases, causes the siloxane to cure more completely. The dead burned magnesium oxide catalyzes the curing of the siloxane without causing the evolution of large amounts of hydrogen. Moreover, the dead burned MgO is commercially available with a consistent composition The catalyst is a dry material that is preferably dry-blended with the calcined gypsum and the other dry materials in order to uniformly distribute the catalyst throughout the calcined gypsum. The dry-mixture containing the catalyst is then added to the pin mixer.

A relatively small amount of the catalyst may be used. It has been found that from about 0.1 to about 0.5% by weight of the dead burned magnesium oxide, based on the weight of the calcined gypsum, may be used. Preferably from about 0.2 to 0.4% by weight of magnesium oxide, based on the weight of the gypsum, is used.

The preferred catalyst is dead-burned magnesium oxide sold under the name "Baymag 96" from Baymag, Inc. of Calgary, Alberta, Canada. It has a surface area of at least 0.3 square meters per gram as measured by BET. It has a loss on ignition of less than 0.1% by weight.

The difference between dead-burned magnesium oxide, used in the present invention, and conventional magnesium oxide can be demonstrated by comparing the increase in temperature when the respective materials are mixed with water.

Rate of the exothermic reaction of dead-burned magnesium oxide ("Baymag 96) and conventional magnesium oxide (Baymag 30) in water was determined using Temperature Rise System (TRS). The TRS unit is an electronic thermoster that measures the heat evolved from the exothermic reaction of MgO with water. Each sample contained 50 grams magnesium oxide and 100 ml water, soaked 10 seconds and hand mixed for 10 seconds. The thermoster is placed into a cup where the magnesium oxide and water mixture has been pored; this cup is in a quasi-temperature stable environment (Styrofoam container). The data is collected by a data acquisition system. The data collected is set forth in Table 1, below:

TABLE 1

| Time (Seconds) | Temperature (° F.) Conventional MgO | Temperature (° F.) Dead Burned MgO |
|---|---|---|
| 10 | 77.07 | 76.04 |
| 100 | 77.60 | 76.17 |

TABLE 1-continued

| Time (Seconds) | Temperature (° F.) Conventional MgO | Temperature (° F.) Dead Burned MgO |
|---|---|---|
| 200 | 77.98 | 76.24 |
| 300 | 78.20 | 76.31 |
| 400 | 78.37 | 76.36 |
| 500 | 78.54 | 76.45 |
| 600 | 78.68 | 76.51 |
| 700 | 78.80 | 76.55 |
| 800 | 78.93 | 76.60 |
| 900 | 79.05 | 76.65 |
| 1000 | 79.16 | 76.70 |
| 1500 | 79.62 | 76.91 |
| 2000 | 80.07 | 76.80 |
| 2500 | 80.50 | Temperature dropping |
| 3000 | 80.96 | Temperature dropping |

Results demonstrate that the reaction of the conventional magnesium oxide with water is significantly different from the reaction of dead burned magnesium oxide with water. Reaction of conventional magnesium oxide with water was more exothermic and caused temperature to rise by ~5° F. whereas the reaction of dead burned magnesium oxide with water showed only slight change (about 0.8° F.) in the temperature. This test may be used to differentiate between a dead burned magnesium oxide and other conventional magnesium oxides.

The preferred catalyst is dead-burned magnesium oxide sold under the name "Baymag 96" from Baymag, Inc. because it produces a temperature rise of less than 1° F. in the Temperature Rise System. Magnesium oxides that produce a temperature rise of no more than about 2° F. are suitable for use in the present invention. Magnesium oxides that produce greater temperature rises, such as the Baymag 30, provide adequate catalysis of the siloxane, but such magnesium oxides are not preferred because they retard of the gypsum rehydration process and cause loss of paper bonding.

EXAMPLES

The following examples will serve to illustrate the preparation of several wallboard compositions within the scope of the present invention. It is understood that these examples are set forth for illustrative purposes and that many other compositions are within the scope of the present invention. Those skilled in the art will recognize that similar compositions for other gypsum based articles may be prepared containing other quantities of materials and equivalent species of materials than those illustrated below.

Example 1

Paper-covered foamed gypsum boards were prepared on a typical full scale production line in a commercial gypsum board manufacturing facility. The ingredients and their approximate weight percentages (expressed as relatively narrow ranges based upon the weight of calcined gypsum employed) are listed in Table 2. A portion of the gauging water is continuously stripped from the gauging water line and fed into a high intensity mixer. The mixer was a Vertiflo Pump Co. Model No 1420-2x-2x8. The required amount of a siloxane fluid is continuously metered into the high intensity mixer where it is mixed with the gauging water for 1-2 seconds to form an oil-in-water emulsion in situ. A ratio of about 25 parts of water is mixed with each part of siloxane. The siloxane/water emulsion was then returned to the gauging water line where it mixed with the balance of the gauging water. The magnesium oxide was dry-blended with the calcined gypsum and other dry ingredients prior to the pin mixed. Except for the inclusion of siloxane and magnesium oxide in the preparation, the boards were prepared using methods and ingredients typical of prior art gypsum board production methods and ingredients. Boards were prepared with various concentrations of siloxane and various amounts of magnesium oxide and were compared with control boards and tested for water resistance in accordance with ASTM Test-1396.

TABLE 2

Gypsum Board Production Ingredients

| INGREDIENT | WEIGHT |
|---|---|
| calcined gypsum | 100 |
| water | 94–98 |
| siloxane | 0.4–0.8 |
| set accelerator | 1.1–1.6 |
| starch | 0.5–0.7 |
| dispersant | 0.20–0.22 |
| paper fiber | 0.5–0.7 |
| set retarder | 0.07–0.09 |
| foaming agent | 0.02–0.03 |
| sodium trimetaphosphate ("STMP") | 0–0.016 |
| recalcination inhibitor | 0.13–0.14 |
| magnesium oxide | 0.1–0.3 |

In Table 2: the set accelerator comprised finely ground sugar-coated particles of calcium sulfate dehydrate, as described in U.S. Pat. No. 3,573,947, wherein the accelerator is not heated during its preparation; the starch was dry-milled acid-modified HI-BOND starch obtained commercially from Lauhoff Grain Co.; the dispersant was DILOFLO, a naphthalene sulfonate obtained commercially from GEO Specialty Chemicals of Ambler, Pennsylvania; the paper fiber was fine hammer milled paper fiber; the set retarder was VERSENEX 80, a chelating agent obtained commercially from Van Walters & Rogers of Kirkland, Washington; the foaming agent was WITCOLATE 1276, obtained commercially from Witco Corp. of Greenwich, Conn.; the sodium trimetaphosphate was supplied commercially by Astaras Co. of St. Louis, Mo.; and the recalcination inhibitor was CERELOSE 2001, a dextrose employed to reduce recalcination of board ends during drying. The siloxane was a fluid sold under the name SILRES BS-94 by Wacker-Chemie GmbH. The magnesium oxide was a dead-burned magnesium oxide sold under the name "Baymag 96" from Baymag, Inc. of Calgary, Alberta, Canada.

The boards were produced on a four foot wide continuous production line by: continuously introducing and mixing the ingredients in a mixer to form an aqueous slurry (the foaming agent was used to generate aqueous foam in a separate foam generating system; the foam was then introduced into the slurry through the mixer); continuously depositing the slurry on a paper cover sheet (face paper) on a moving belt; placing another paper cover sheet (back paper) over the deposited slurry to form 'h. inch thick board; when the hydration of the calcium sulfate hemihydrate to form calcium sulfate dihydrate proceeded far enough to make the slurry hard enough to cut precisely, cutting the moving board to make individual boards of about 12×4 feet and ½ inch thick; and drying the boards in a heated multideck kiln.

Typical moisture absorption values for such products when tested in accordance with ASTM Test 1396 are shown below in Table 3.

TABLE 3

| Product | Siloxane % | MgO % | Moisture Absorbed % |
|---|---|---|---|
| Water Resistant Gypsum Board | 0.8% | 0.2% | 4.5% |
| Core-Treated Gypsum Sheathing Board | .04% | 0.2% | 8% |

Example 2

A laboratory test was run to demonstrate the effect of dead-burned magnesium oxide on the water resistance developed by a siloxane in a gypsum-based article. An emulsion was formed by mixing 0.7% of BS-94 siloxane and 550 grams of water in high shear mixer for 7500 rpm for 2.5 minutes. In tests 1-3, the emulsion was then mixed with 500 grams of a calcined natural gypsum, 0.1 grams of CSA and a selected amount of Baymag 96 magnesium oxide in a Waring Blender for 10 seconds and formed into cubes which were heated overnight. Test 4 was run in the same manner except that a calcined synthetic gypsum was used. In all tests, 0.7% by weight of the siloxane was used. The selected amount of Baymag 96 used in tests 1-4 is shown in Table 4, below. Within 24 hours of the manufacture, the cubes were immersed in water for 2 hours absorption in accordance with ASTM Test 1396 and tested for moisture. Three tests were run at each level and the average moisture level for the three tests is shown in Table 3.

TABLE 4

| Test No. | MgO % | Moisture Absorbed % after 2 hours. |
|---|---|---|
| Control | 0 | 47.7 |
| 1 | 0.05% | 13.0 |
| 2 | 0.2% | 8.6 |
| 3 | 0.5% | 4.6 |
| 4 | 0.2% | 3.8 |

The sample of test 4, made with synthetic gypsum, absorbed less moisture than the sample of test 2 made with a natural gypsum, although the same amount of Baymag 96 was used in both tests. The difference is attributed to the impurities, such as fly ash, that are typically found in synthetic gypsums.

The forms of invention shown and described herein are to be considered only as illustrative. It will be apparent to those skilled in the art that numerous modifications may be made therein without departing from the spirit of the invention and the scope of the appended claims.

We claim:

1. A method for making a water-resistant gypsum-based board comprising:
   (A) mixing a siloxane emulsion with the gauging water used to prepare said gypsum-based board;
   (B) mixing a small amount of dead-burned magnesium oxide with calcined gypsum, wherein the amount of magnesium oxide is from 0.1 to about 0.5 wt % of the gypsum;
   (C) mixing said siloxane emulsion/gauging water mixture with said calcined gypsum/magnesium oxide mixture to form an aqueous slurry;

(D) allowing said dead-burned magnesium oxide to catalyze cross-linking of said siloxane; and (E) shaping said slurry and allowing said shaped slurry to set to form a set gypsum-based, water-resistant board.

2. A method according to claim 1 wherein said magnesium oxide produces a temperature rise of no more than 1 degree Fahrenheit in the Temperature Rise System.

3. A method according to claim 1 wherein said magnesium oxide has a surface area of at least 0.3 square meters per gram as measured by BET.

4. A method according to claim 1 wherein said magnesium oxide has a loss on ignition of less than 0.1% by weight.

5. A method according to claim 1 wherein the amount of magnesium oxide is from about 0.2 to about 0.4 wt % of the gypsum.

6. A method according to claim 1 wherein said siloxane is poly(methyl hydrogen siloxane).

7. A method according to claim 6 wherein said poly (methyl hydrogen siloxane) comprises from about 0.3 to about 1.0 wt. % of the dry ingredients of the set of gypsum board.

8. A method according to claim 6 wherein the quantity of said poly (methyl hydrogen siloxane) is about 0.4 to about 0.8 wt. % of the dry ingredients of the set gypsum board.

9. The method of claim 1 further comprising selecting the siloxane in the siloxane emulsion from the group consisting of a linear, hydrogen-modified siloxane and a cyclic, hydrogen-modified siloxane.

10. A method for making a water-resistant gypsum-based board comprising:

(A) mixing a quantity of a siloxane fluid with a portion of the gauging water used to prepare said gypsum-based board in a high intensity mixer to form a siloxane/water emulsion in situ;

(B) mixing a small amount of dead-burned magnesium oxide with calcined gypsum;

(C) mixing said siloxane/water emulsion with the balance of the gauging water;

(D) mixing said gypsum/magnesium oxide mixture with the siloxane/water mixture of step (C) to form an aqueous slurry;

(E) allowing said dead-burned magnesium oxide to catalyze cross-linking of said siloxane; and (F) shaping said slurry and allowing said shaped slurry to set to form a set gypsum-based, water resistant board.

11. A method according to claim 10 wherein said siloxane/water emulsion is formed in the absence of an emulsifier.

12. A method according to claim 10 wherein about 25 parts by weight of gauging water are mixed with each part by weight of siloxane in step (A).

13. A method according to claim 10 wherein the amount of magnesium oxide is from about 0.1 to about 0.5 wt % of the gypsum.

14. A method for incorporating siloxane while forming a water-resistant, gypsum-based board, comprising:

(A) mixing a quantity of siloxane fluid with a portion of the gauging water used to prepare said gypsum-based board in a high intensity mixer to form a siloxane emulsion;

(B) mixing said siloxane emulsion with balance of the gauging water, calcined gypsum and from about 0.1 to about 0.5 wt % of the gypsum of dead-burned magnesium oxide to form an aqueous slurry;

(C) allowing said dead-burned magnesium oxide to catalyze cross-linking of said siloxane; and (D) shaping and allowing said slurry to set to form a set gypsum-based, water-resistant board, said board absorbing less than about 10% of its own weight in water when immersed at 70° F. for two hours in accordance with ASTM Standard 1396 within 24 hours.

* * * * *